(12) United States Patent
Chou (10) Patent No.: US 8,756,004 B2
(45) Date of Patent: Jun. 17, 2014

(54) IDENTIFICATION TAG NAVIGATION SYSTEM AND METHOD THEREOF

(75) Inventor: Feng-Jian Chou, Hsinchu Hsien (TW)

(73) Assignee: MStar Semiconductor, Inc., Hsinchu-Hsien (TW)

( * ) Notice: Subject to any disclaimer, the term of this patent is extended or adjusted under 35 U.S.C. 154(b) by 1118 days.

(21) Appl. No.: 12/425,061

(22) Filed: Apr. 16, 2009

(65) Prior Publication Data

US 2010/0049432 A1    Feb. 25, 2010

(30) Foreign Application Priority Data

Aug. 21, 2008   (TW) ............................... 97131991 A (51) Int. Cl.
*G01C 21/34*    (2006.01)

(52) U.S. Cl.
USPC ............ 701/428; 701/410; 701/468; 701/533

(58) Field of Classification Search
USPC ........................ 701/410, 428, 431, 468, 533; 340/995.19, 995.26
See application file for complete search history.

(56) References Cited

U.S. PATENT DOCUMENTS

| | | | | |
|---|---|---|---|---|
| 5,544,061 | A   * | 8/1996  | Morimoto et al. | 701/533 |
| 6,138,073 | A   * | 10/2000 | Uchigaki | 701/410 |
| 6,738,712 | B1  * | 5/2004  | Hildebrant | 701/431 |
| 7,389,182 | B2  * | 6/2008  | Tomita et al. | 701/420 |
| 7,487,042 | B2  * | 2/2009  | Odamura | 701/420 |
| 7,606,664 | B2  * | 10/2009 | Yokozawa | 701/434 |
| 2005/0245271 | A1 * | 11/2005 | Vesuna | 455/456.1 |
| 2008/0051991 | A1 * | 2/2008  | Lee et al. | 701/209 |
| 2008/0300780 | A1 * | 12/2008 | Domnin | 701/202 |
| 2009/0024309 | A1 * | 1/2009  | Crucs | 701/118 |
| 2009/0228208 | A1 * | 9/2009  | Yang | 701/211 |

* cited by examiner

*Primary Examiner* — Ernesto Suarez
(74) *Attorney, Agent, or Firm* — WPAT, PC; Justin King (57) ABSTRACT

An identification tag navigation system and a method thereof are provided according to the invention. The system comprises at least an identification tag and a mobile apparatus. The method comprises steps of receiving a destination reading command, accessing a destination information of the identification tag, receiving a plurality of reference signals and computing a current position data according to the plurality of reference signals, computing and generating a navigation route data according to the destination position data and the current position data, and generating an instruction data according to the navigation route data and the current position data.

14 Claims, 8 Drawing Sheets

IDENTIFICATION TAG NAVIGATION SYSTEM AND METHOD THEREOF

CROSS REFERENCE TO RELATED PATENT APPLICATION

This patent application is based on a Taiwan, R.O.C. patent application No. 097131991 filed on Aug. 21, 2008.

FIELD OF THE INVENTION

The invention relates to an identification tag navigation system and a method thereof, and more particularly, to a system integrating a radio frequency identification (RFID) technology with positioning navigation technology, and a method thereof.

BACKGROUND OF THE INVENTION

As digital electronic technology develops continuously, electronic apparatuses or electronic products with various different application functions are frequently applied in the daily life of modern people. For example, the development of mobile computing technology provides a mobile phone with data processing or video entertainment capabilities, in addition to original communication capabilities, while the foregoing functions may be expanded by combining other technologies. Moreover, a navigation function operated by a navigation system is widely applied to the electronic industry technology. A general and most widely used navigation system comprises a global positioning system (GPS). The GPS technology implements a GPS signal receiver to receive signals transmitted from multiple satellites and computes the accurate position data, such as a longitude and latitude data, or a coordinate data corresponding to a map and so on, according to the signals from the satellites. When the GPS technology is associated with a mobile computing apparatus such as a mobile phone or a personal digital assistant (PDA), some applications, such as positioning, detection, navigation, searching and guarding, are achieved.

At present, the GPS or satellite positioning technology is extensively used in a satellite navigation system with electronic map in a vehicle, a ship, or an aircraft, and it is also used in personal mobile apparatus for positioning and navigation. When the mobile computing apparatus receives the satellite positioning signals, a current position data, a coordinate data, a motion direction, and a motion speed could be computed by the apparatus and displayed on the screen of the apparatus. Regardless of setting in the navigation apparatus in a moving vehicle or been held in one's hand, a corresponding position and the motion information, such as landmark names, geographical attractions or traffic conditions, are generated according to the electronic map in real time.

Furthermore, a navigation apparatus including high computing capabilities, a memory with a large capacity, and an accurate electronic map, provides the positioning and navigation function for a user before a journey. First, the user enters a destination information such as the address by the user interface. Then, the navigation apparatus finds out a best route by computing according the GPS signals and the electronic map, so as to guide the user to successfully drive a vehicle from an origin to the destination according to the route. Finally, the navigation apparatus shows the route and the indication on the screen by a two/three dimensional simulation diagram to make the user easily driving or walking to the destination.

However, the present GPS system does have a several shortcomings. For example, on top of having to manually enter the destination in texts via a display screen, the display screen in return gives the navigation apparatus a larger volume and a higher cost. Further, when an incorrect address is entered, errors in routing or destination searching are incurred to undesirably influence wills of the user in using the GPS system. In addition, although a general navigation apparatus displays the current position and the motion information according to the electronic map, in some specific area such as an exhibition hall or a tourist park, the electronic map is not capable of effectively displaying a detailed map data, structures, or features of the area. Thus, navigation effects generated by the general navigation apparatus are limited. Therefore, to overcome the foregoing shortcomings, one of the objectives of the present invention is to provide a suitable navigation apparatus and a navigation technology.

SUMMARY OF THE INVENTION

One of the objectives of the present invention is to provide an identification tag navigation system and an application method thereof. By combining RFID data reading capabilities with satellite positioning navigation capabilities, the present invention provides a user with direction instructions to a destination in a convenient and direct manner. According to the present invention, the identification tag navigation system comprises at least one identification tag and a mobile apparatus. The at least an identification tag, for storing a destination information comprising at least a destination position data. The mobile apparatus, for use of navigation, comprising an identification tag reading module, for accessing the destination information stored in the identification tag; a position module, for receiving a plurality of reference signals to generate a current position data; a memory, for storing a geographical data; a navigation module, for generating a navigation route data according to the destination position data, the current position data, and the geographical data and generating an instruction data according to the current position data and the navigation route data; and an indicating module, for showing a direction instruction according to the instruction data.

According to another aspect of the present invention, An identification tag navigation method, for receiving a destination information from an identification tag to generate an direction instruction data, the method comprising steps of receiving the destination information from the identification tag, wherein the destination information comprises at least a destination position data; receiving a plurality of reference signals to generate a current position data; computing a navigation route data according to the destination position data, the current position data, and a geographical data; and providing a direction instruction according to the navigation route data and the current position data.

Moreover, according to another aspect of the present invention, An identification tag navigation apparatus, for receiving a destination information from an identification tag to generate an direction instruction data, the apparatus comprising an identification tag reading module, for accessing the destination information from the identification tag, wherein the destination information comprises at least a destination position data; a position module, for receiving a plurality of reference signals to generate a current position data; a memory, for storing a geographical data; a navigation module, for generating a navigation route data according to the destination position data, the current position data and the geographical data and generating an instruction data according to the current position data and the navigation route data; and an indicating module, for showing a direction instruction according to the instruction data.

Following description and figures are disclosed to better understand of the advantages of the present invention.

BRIEF DESCRIPTION OF THE DRAWINGS

FIG. 2 (a) is a functional block diagram of the identification tag navigation system 100.

FIG. 2 (b) is a schematic diagram of a detailed structure of a main surface of a watch 10.

FIG. 3 (a) is a data block of an identification interface block 2010 and a data storage block 2011 in an identification tag 201.

FIG. 3 (b) is a flow chart of determining an identification tag.

FIG. 4 (a) is a flow chart of setting a starting position P0.

FIG. 4 (b) is a flow chart of accessing and storing a data representing a destination position T1.

FIG. 4 (c) is a flow chart of generating a navigation route data and operating direction instructions of an instruction data.

DETAILED DESCRIPTION OF THE PREFERRED EMBODIMENT

Figure 1:
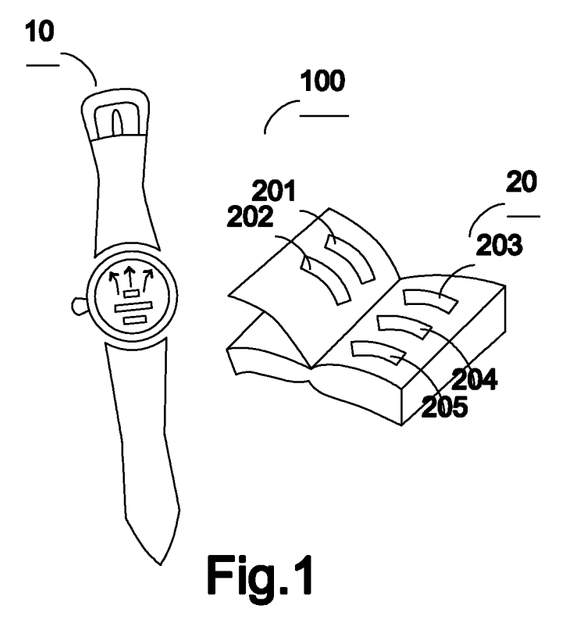
FIG. 1 is a schematic diagram of an identification tag navigation system 100.

Refer to FIG. 1 showing a schematic diagram of an identification tag navigation system 100. The identification tag navigation system 100 comprises a mobile apparatus and a plurality of tags carriers. In this embodiment, the mobile apparatus is a watch 10, which is portable when worn on the wrist of a user. One of the plurality of tag carriers is a guiding manual 20, which has a plurality of identification tags 201 to 205. The plurality of identification tags are a kind of RFID electronic tags in an electronic structure manufactured from an RFID technology. The watch 10 of the mobile apparatus is designed to identify and access the plurality of identification tags via a corresponding module and an identification reading procedure according to the identification technology.

According to the present invention, the identification tag navigation system 100 is applied to a specific navigation area to provide a motion navigation and direction instructions for the user. In a preferred embodiment, a navigation service is provided for a walker within a navigation area, so as to provide direction instructions when the walker moves from a current position to a destination position. The navigation area is a specified region, such as a museum, an amusement park, a tourist park or a touring site and so on. Various attractions, venues, shops or areas with kinds of visiting purposes within the region are provided for a visitor. Therefore, settings of the attractions are related to those of the plurality of identification tags of the guiding manual 20 of the user. In other words, in addition to basic pictorial and text data of introductions on the attractions on the guiding manual 20, the foregoing RFID tags are correspondingly attached to the guiding manual 20. Therefore, by directly accessing the foregoing RFID tags via the watch 10 of the mobile apparatus, the user is facilitated to move toward the destination according to guidance provided through display or instructions of the watch 10.

In view of the foregoing issues, the watch 10 is provided in conjunction with the guiding manual 20 to the user in the preferred embodiment. For example, when an organizer in charge of the region sells admission tickets to visitors when hosting an event, the watch 10 and the guiding manual 20 are provided as well to give the visitors access to the navigation service of the system. Alternatively, a combination of the watch 10 of the mobile apparatus and the guiding manual 20 may be obtained or purchased based on free will the user. In other preferred embodiments, the tag carrier mentioned above is designed as the admission or a guiding ticket of a certain park or shop, and a corresponding identification tag is provided on the admission or the guiding ticket. The foregoing tag carrier may also be designed as a guiding map, on which a plurality of identification tags are equipped to conveniently provide quick searching on visiting purposes and guiding directions for the user. Moreover, the tag carrier is designed as a data bulletin board within the navigation area or routes near the vicinity of the navigation area. The data bulletin board comprises data of maps or attraction introductions, with the plurality of identification tags being equipped on the data bulletin board to provide navigation service.

Figure 2A:
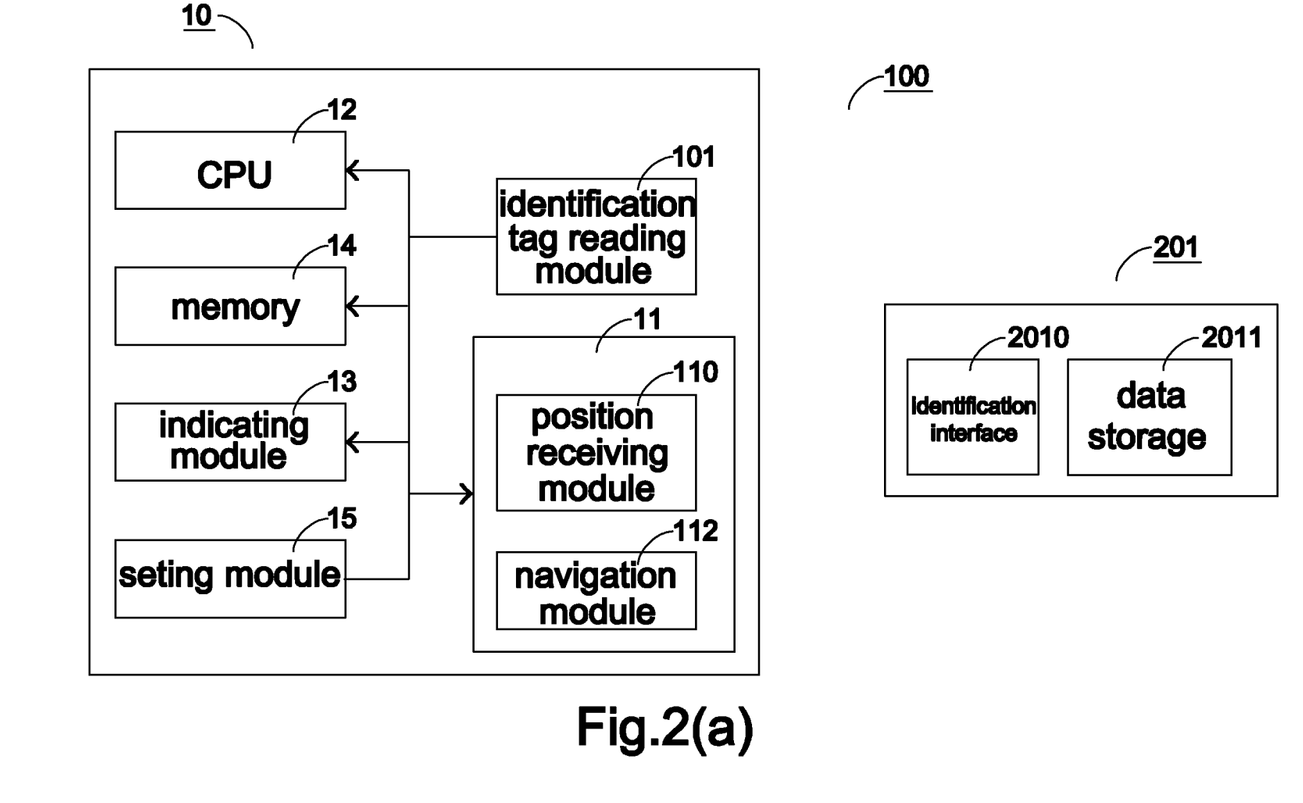

Refer to FIG. 2 (a) showing a functional block diagram of the identification tag navigation system 100. As described above, the watch 10 of the mobile apparatus of the system identifies and accesses an object of the corresponding tag carrier using the RFID technology; that is, the guiding manual 20 has a plurality of identification tags. An identification tag 201 is to be used as an example for illustrations in the embodiment. The watch 10 comprises an identification tag reading module 101, a navigation unit 11, a central processing unit (CPU) 12, a memory 14, an indicating module 13 and a setting module 15. The identification tag 201 further comprises a data storage block 2011 for storing a destination information, and an identification interface block 2010. The destination information is used for navigation purposes and, being compliant with the RFID technology, is provided to the identification tag reading module 101 for performing identification. The identification interface block 2010 determines whether to allow access to the destination information.

Using RFID, the identification tag reading module 101 identifies the identification interface block 2010 and proceeds with further data accessing. The accessed destination information is then transmitted to the navigation unit 11 for subsequent processing. The navigation unit 11, serving as a main element for computing a navigation route, comprises a position receiving module 110 and a navigation module 112. The position receiving module 110 generates a current position data by receiving a plurality of reference signals transmitted by a positioning system. The navigation module 112 performs associated computation, so that the navigation unit 11 generates a required navigation route data using the two modules and the received destination information. Main instruction or display processing of the watch 10 as well as the unit setting and control are performed by the CPU 12. Detailed operation processes of identification accessing, navigation route data computations and navigation instructions shall be discussed below.

Figure 3A:
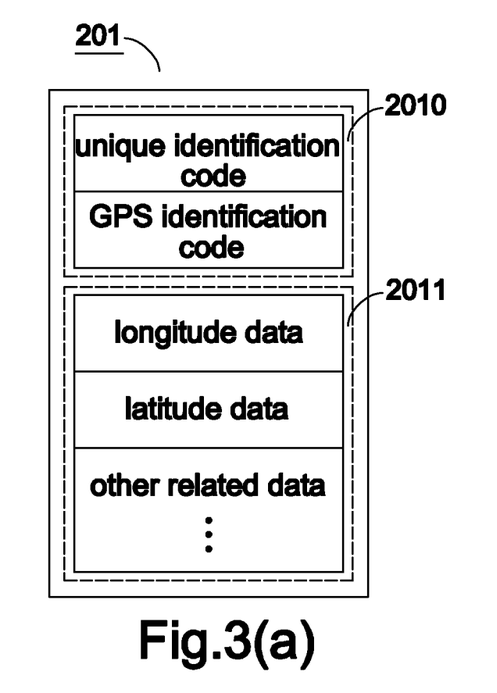

Refer to FIG. 3 (a) showing a schematic diagram of the identification tag 201 in an RFID tag format according to the present invention. The identification tag 201 comprises the identification interface block 2010 and the data storage block 2011. The plurality of identification tags of the guiding manual 20 are used for inquiring and guiding in navigation, and are designed via a special RFID format. The identification interface block 2010 of the identification tag comprises a unique identification code, which is distinguishable from other tags and a positioning system identification code. For example, the identification interface block 2010 is designed in form of an eight-bit memory block according to the RFID standard and a four-bit memory block for indicating uses of the tag regarding navigation inquiries according to the GPS standard. Further, an open-system identification format is implemented for tag identification; that is, no encrypted process is needed in order to provide an open and convenient navigation inquiry. In addition, the data storage block 2011 is usually designed by a four-bit memory block for storing at least longitude and latitude data of a position. Depending on the memory size, the data storage block 2011 may still store other related data mapping to the position, such as a store name, an address or other user-defined data.

Figure 3B:
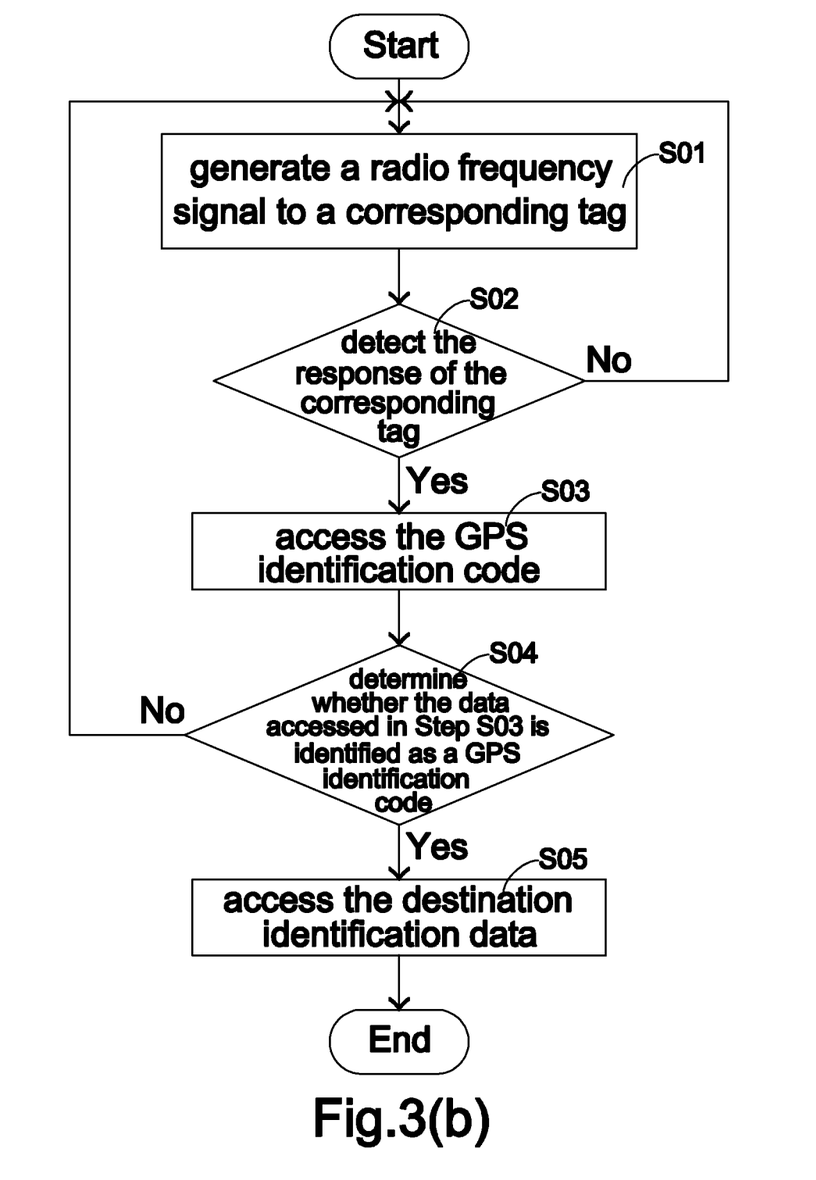

Referring to FIG. 3(*b*), the user determines whether an identification object is a needed RFID tag according to a flow chart illustrated. The flow chart begins with Step S01 that a portable apparatus, such as the watch 10, generates a radio frequency signal to detect whether a corresponding tag exists, and attempts to receive a response of the corresponding tag. In Step S02, the portable apparatus determines whether the corresponding tag is detected. When the corresponding tag is detected, In Step S03, the portable apparatus accesses the GPS identification code from the corresponding tag. Step S04 of determining whether the data accessed in Step S03 is identified as a GPS identification code is performed, i.e., it is determined whether the corresponding tag identified is a tag for navigation inquiring purposes. When the GPS identification code is matched, Step S05 of accessing the destination identification data or accessing other related data stored in the data storage block 2011 is performed, so as to execute a subsequent navigation operation process.

Through the above identification procedure, the corresponding identification tag is identified whether being an RFID tag applied for the navigation inquiring purposes or other uses, so as to avoid accessing errors when the user is faced with a variety and a large number of RFID tags. Consequently, the tag, to be identified and accessed, having the data of the foregoing GPS identification code, is the identification tag operated according to the navigation method of the present invention. In other words, the identification tag reading module 101 determines whether the object to be identified is an RFID tag, and then determines whether the identified and accessed tag has the foregoing GPS identification code. Taking the identification interface block 2010 in FIG. 3 (*a*) for example, when the determining procedure confirms the identifying object is the RFID tag having the GPS identification code, the tag can be applied as the identification tag with a dedicated use for navigation provided to the user, and to in turn access the related data needed.

In the preferred embodiment, the navigation service is processed and completed via the GPS technology. Hence, the destination information stored in a identification tag represents a destination position, with the data being such as the longitude and latitude data of a certain park, a venue, an attraction or a shop, or even an address data or a coordinate data. The memory 14 of the watch 10 is stored with a geographical data corresponding to a database of the GPS system, such as an electronic map data within a specific region and a coordinate data of a related attraction position on the map, as well as an actual corresponding address data, the longitude and latitude data, a length and width data of related roads or routes.

The position module 110 comprises an antenna for receiving the plurality of reference signals. Specifically, the position module 110 receives GPS satellite signals transmitted from multiple GPS satellites. Hence, when receiving the GPS satellite signals, the position module 110 computes a current position according to these signals and the electronic map. The navigation module 112 receives the destination information previously accessed by the identification tag reading module 101 and the current position data. And the navigation module 112 generates a navigation route data according to the current position data, the geographical data and a destination position data in the destination information. The navigation module 112 further generates an instruction data according to a latest current position data and the navigation route data, and generates direction instructions for guiding the user to move from the current position to the destination position.

Figure 2B:
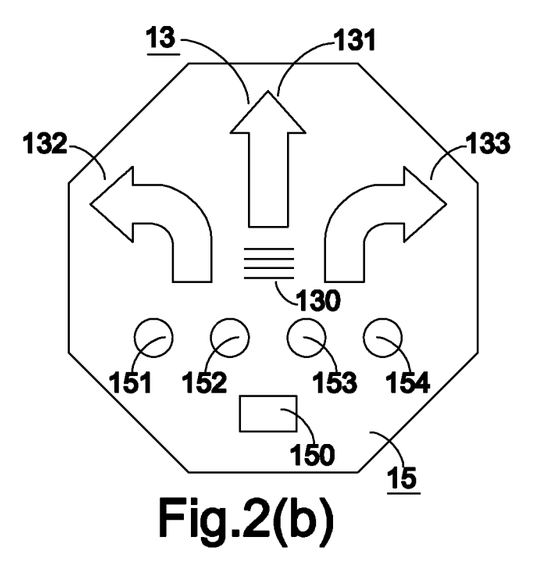

The navigation route data mentioned above is a description of the motion route from the current position to the destination position. The current position and the destination position are determined and set respectively by the setting module 15 and the central processing unit 12. The instruction data is used to generate the direction instructions displayed on the indicating module 13 for providing guidance to the user. A detailed structure is illustrated according to FIG. 2 (*b*). The setting module 15 comprises four destination setting buttons 151 to 154 on the surface of a main body of the watch 10, such that the user is capable of setting four destination positions. Specifically, the user starts the identification tag reading module 101 to access a corresponding identification tag via the destination setting buttons 151 to 154. However, the number of the destination setting buttons can be designed according to conditions provided by a hardware apparatus. The setting module 15 further comprises a start position setting button 150 for providing a position setting of the start position before the user moves.

The indicating module 13 at least comprises three direction indicator lights 131 to 133 respectively indicating a forward direction, a leftward direction and a rightward direction. Under controls of the CPU 12, the direction indicator lights give direction instructions by being on, off or flashing according to the instruction data previously generated. In the preferred embodiment, the indicating module 13 further comprises a sound unit 130. Being similar to the direction indicator lights, the sound unit 130 gives direction instructions using a sound effect or a voice prompt according to the instruction data previously generated. For example, the sound may be a rapidly-paced or moderately-paced sound transmitted from a buzzer or a human voice giving guidance prompts of the motion direction.

Figure 4A:
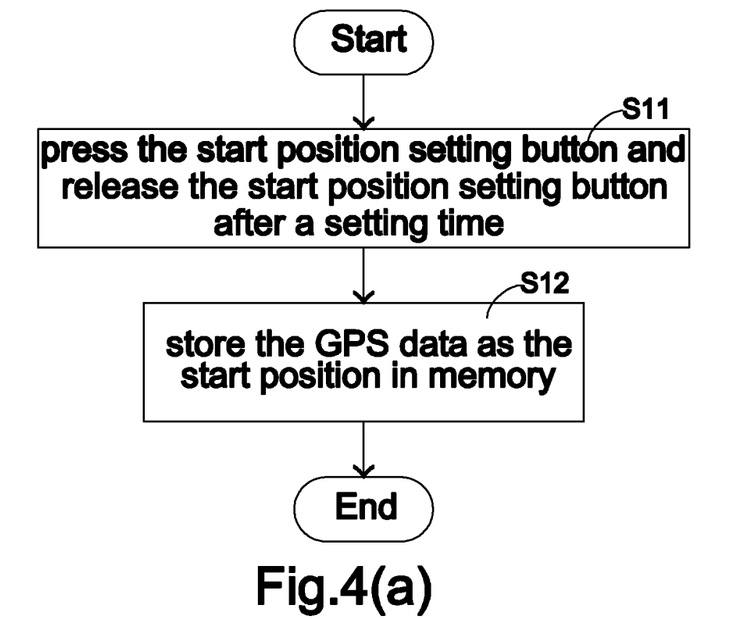
Figure 4B:
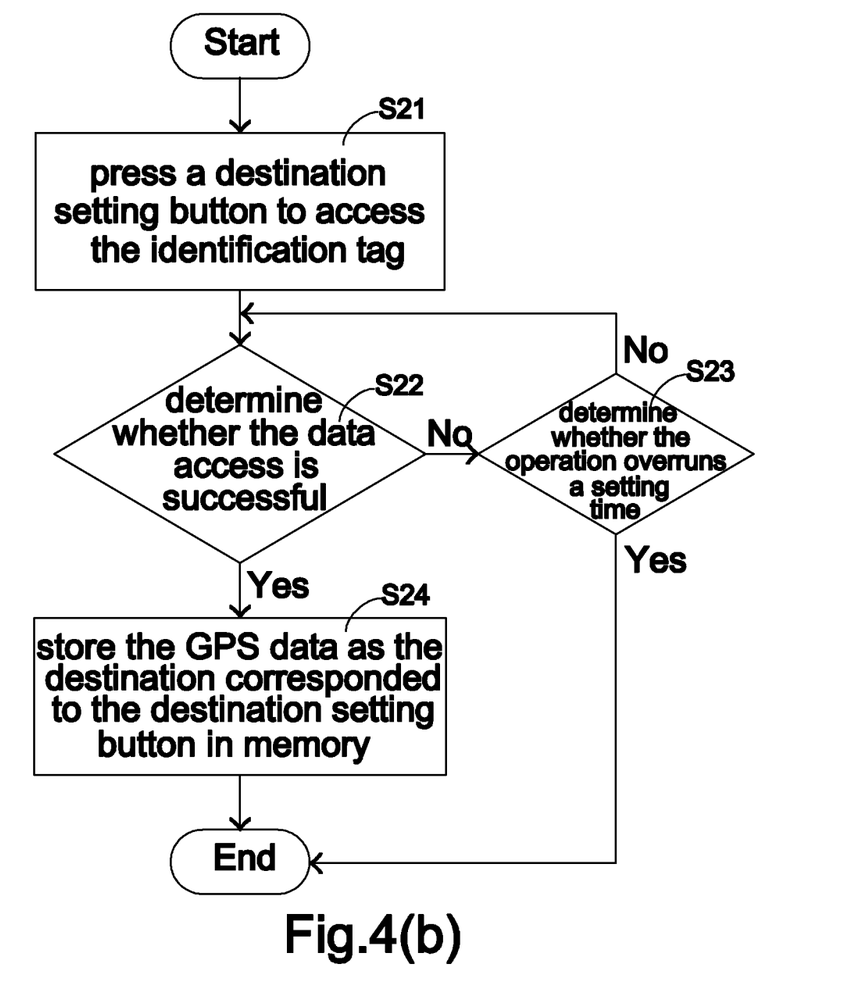
Figure 5:
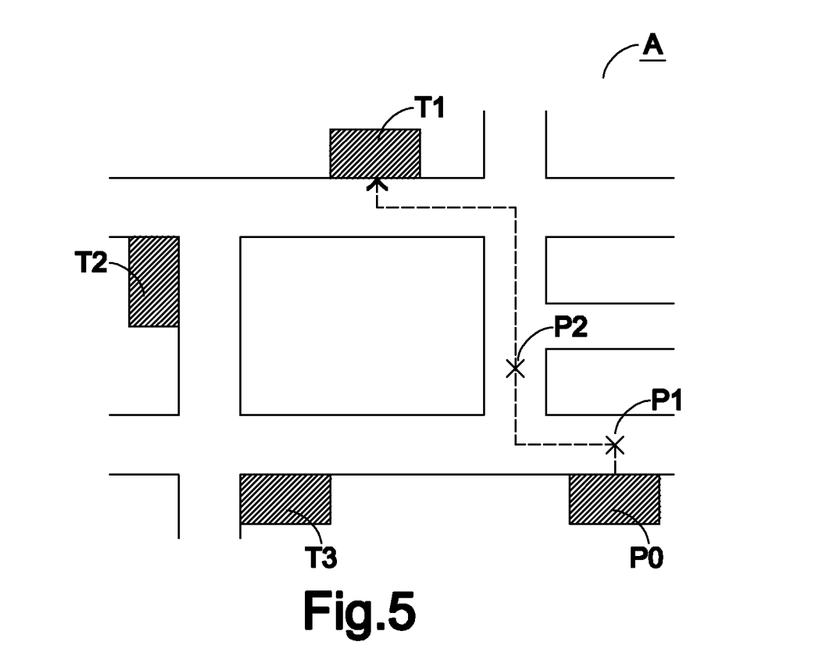
FIG. 5 is a schematic diagram of a navigation area A.

Refer from FIG. 4 (*a*) to FIG. 4 (*b*) showing a flow chart of the identification tag navigation method according to the embodiment, and refer to FIG. 5 showing a schematic diagram of using the watch 10 as the mobile apparatus for navigation within a navigation area A. As shown in the flow chart in FIG. 4 (*a*), a start position setting button 150 is used to provide settings for subsequent navigation or positioning applications. The user sets a start position P0 before beginning with a tour or a visit. In the preferred embodiment, the start position P0 is a start point of a trip or a position for returning when the trip ends, and may be, for example, a restaurant or a hotel for accommodation, an entrance of the park or a station for transportation.

Referring to FIG. 4 (*a*), the user operates the start position setting button 150 at the start position P0. In Step S11, preferably the user presses the start position setting button 150 and releases the start position setting button 150 after a few seconds, and the position module 110 positions the start position P0 according to the received GPS satellite signals. In Step S12, the memory 14 stores the GPS data such as the longitude and latitude data or a coordinate data representing the start position P0. When the setting process is completed, and the user leaves the start position P0 or wishes to return to the start position P0 after having visited the navigation area A, the user presses the start position setting button 150. Preferably the start position setting button 150 is released right after being pressed by the user. When the GPS satellite signals and the latest current position of the user are constantly received, the navigation module 112 begins navigation computations according to the GPS data of the start position P0. The indicating module 13 displays direction instructions computed, such as by switching the direction indicator lights and playing the voice prompts of the sound unit 130, so as to guide the user to move from the current position to the start position P0. The process of guiding the user to the original start position is the same as a subsequent flow of navigation route data computations and instruction data operations to be discussed below.

Referring to FIG. 4 (b), the user sets the destination setting buttons 151 to 154 for use of the subsequent navigation positioning applications. The mobile apparatus first receives a destination reading command generated by pressing one of the destination setting buttons. Preferably, the user aims the watch 10 at an identification tag 201 representing a destination position T1 of the guiding manual 20 within a suitable distance. Moreover, in Step S21, the user presses a destination setting button 151 to start the identification tag reading module 101, so as to access a destination information from the identification tag 201. A preferred distance of 3 to 5 centimeters is associated with a preferred RFID frequency, and the destination setting button 151 is pressed for a few seconds. In Step S22, the destination information of the identification tag 201 is accessed, and it is determined whether the data access is successful. When the destination information is not accessed correctly, whether the operation overruns a setting time is determined in Step S23. When the answer is no, Step S22 is repeated. When the answer is yes, Step S22 and Step S23 are repeated. In Step S24, having accessed successfully, the destination information is stored in the memory 14; that is, the GPS data representing the destination position T1, such as the longitude and latitude data, an address or a coordinate data, is correspondingly stored. The data is corresponding to the destination setting button 151. Therefore, when the user wishes to head to the destination position T1, the destination setting button 151 is pressed, and the indicating module 13 indicates direction instructions according to the corresponding data.

According to corresponding figures of the embodiment, the user accesses and stores the destination position data of at least four destination positions, such as other destination positions T2 and T3. In other words, before a tour begins, the user accesses and stores the destination information from the identification tag, which is used for computing navigation route data and generating navigation instructions during the tour. For example, the destination setting button 151 represents a gymnasium, the destination setting button 152 represents a tourist center and the destination setting button 153 represents a restaurant. The user may access and store one or more destination position data as desired. However, when the data storage areas of the memory 14 are correspondingly stored with four destination positions, and the user wishes to access and store another identification tag data, such as an identification tag data from an information bulletin board during the visit, corresponding to an information of a shop, the user can press one of the destination setting buttons to access the data, which shall overwrite the original data of the pressed destination setting button.

Figure 4C:
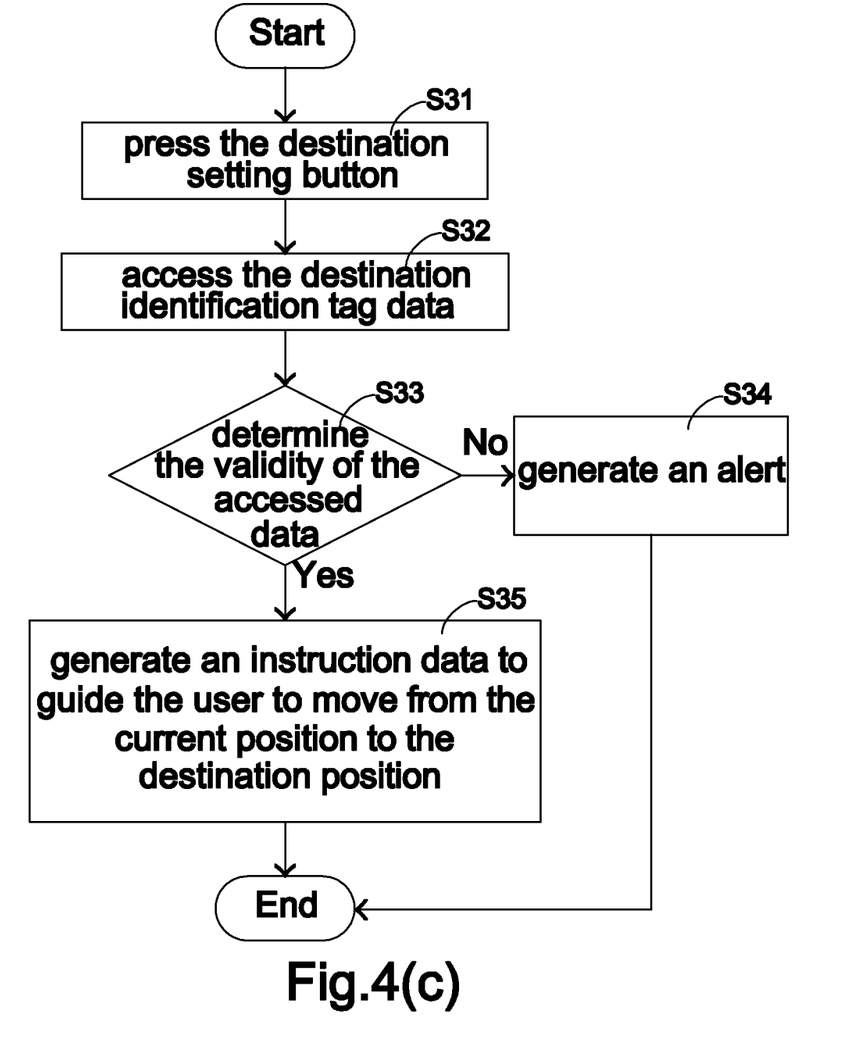

A detailed flow of generating the navigation route data and operating direction instructions of the navigation route data is illustrated in FIG. 4 (c). As mentioned above, the needed data is stored in the memory 14 corresponding to the destination setting button 151. Referring to FIG. 5, when the user wishes to proceed to the destination position T1, the user presses the corresponding destination setting button 151 and preferably releases the destination setting button 151 soon in Step S31. The corresponding data is accessed in Step S32 and is computed by the navigation module 112. In Step S33, validity of the accessed data is determined, so as to determine whether the data is a positioning data related to GPS. When the data is valid, the navigation module 112 continues to compute the data. When the data is invalid, the mobile apparatus gives an alert for reminding the user to reset the destination setting button in Step S34.

The position module 110 then positions a position of the watch 10 such as a current position P1 in FIG. 5 according to the received GPS satellite signals. The navigating module 112 computes a motion route from the current position P1 represented by the current position data to the destination position T1 represented by the destination position data, according to the geographical data of the GPS database. That is, the navigation module 112 computes a most suitable motion route such as a route represented by a dotted line within a navigation area A of FIG. 5, according to conditions of direction, length or width of a road recorded by an electronic map, or traffic ability. Therefore, the navigation module 112 generates a navigation route data, which is a description of the motion route from the current position P1 to the destination position T1. The navigation module 112 continuously generates an instruction data according to the current position data and the navigation route data. The indicating module 13 further displays corresponding direction instructions by direction indicator lights or sounds, according to the instruction data, so as to guide the user to move from the current position P1 to the destination position T1 in Step S35.

In continuation of the above description, the navigation module 112 computes the navigation route data and continuously generates the instruction data. The position of the user changes when the user moves. As a result, the position module 110 continuously receives GPS satellite signals to position a latest position of the user or the mobile apparatus, thereby updating the position within a few seconds. When the position is updated, a latest position status is compared with the corresponding electronic map and the navigation route data to identify the direction, so as to indicate a latest instruction data for getting to the destination position T1.

For example, referring to FIG. 5, when the user presses the destination setting button 151 at the current position P1 to read the corresponding data and to start a navigation function, the instruction data indicates that the user goes straight and then turns right, and goes straight and turns left to arrive at the destination position T1. When the user presses the destination setting button 151 at the current position P2 to read the corresponding data and to start the navigation function, the instruction data indicates that the user goes straight and then turns left to arrive at the destination position T1. The length of the actual motion route is determined according to the positioning result and the geographical data of the electronic map, and the user is facilitated to successfully arrive at the destination position T1 via the display or indication of the indicating module 13.

In conclusion, according to the present invention and the corresponding identification tag navigation method, the user can conveniently acquire the navigation guidance of the destination position where the user wishes to travel to within a specific area via the identification tag navigation system. Because of the convenience and high speed of the identification tag data accessing technology, the user can easily access and acquire the needed information from the nearby vicinity or the tag carrier. Moreover, according to a preferred design of portable apparatus of the present invention, the display or the guiding interface easy to identify is structured by a compact and simple watch, which effectively achieves positioning and destination navigation functions.

In addition, the indicating module may further comprise a small liquid crystal display (LCD), and the corresponding identification tag data comprises some information of the destination, such as an address, a telephone number, exhibition or sale details, and business hours. The data is accessed and displayed on the LCD for enhanced navigation services. The watch is illustrated as the mobile apparatus of the present invention for example, and the design concept of the present invention is also applied to other potable electronic apparatuses, such as a cell phone, a mobile phone, a personal digital assistant (PDA), and so on. Alternatively, the design concept is integrated into units and modules of a certain electronic apparatus with the same functions as those of the watch in the foregoing embodiment, for example. Thus, the electronic apparatus is allowed to become an identification tag navigation apparatus operating the navigation method of the present invention, whereby effects of accessing the RFID identification tag and providing navigation to the destination position are similarly achieved. Hence, a common navigation apparatus that generally is large in size and high in cost in the prior art is significantly improved using the apparatus and the method according to the present invention. Further, not only the inconvenience of having to manually entering the destination address or the frequent entering errors when using a conventional navigation apparatus are solved by using the RFID reading technology, but the problem that effective and suitable navigation services are not always provided within a specific area having various visiting destinations is also solved. Therefore, main objectives of the present invention are successfully accomplished.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An identification tag navigation system, comprising:
   a radio frequency identification tag comprising:
      a data block, for storing a destination information wherein the destination information comprising a destination position data;
      a tag carrier, for designating the radio frequency identification tag as an admission ticket to a region defined by a set of GPS coordinates; and
      an identification interface block, for storing a unique identification code used to distinguish the radio frequency identification tag from all other tags, and a GPS identification code used to determine whether to access the destination position data; and
   a mobile apparatus, for use in navigation, comprising:
      a radio frequency identification tag reading module, for accessing the destination position data stored in the radio frequency identification tag if the GPS identification code is recognized and determining whether the presence of the destination information is present and retrievable from said radio frequency identification tag based on the GPS identification code;
      a position module, for receiving a plurality of reference signals to generate a current position data;
      a memory, for storing a geographical data;
      a navigation module, for generating a navigation route data according to the destination position data, the current position data, and the geographical data, and for further generating an instruction data according to the current position data and the navigation route data; and
      an indicating module, for indicating a direction instruction according to the instruction data.

2. The identification tag navigation system as claimed in claim 1, wherein the mobile apparatus further comprises:
   a destination setting button, for triggering the identification tag reading module to access the identification tag.

3. The identification tag navigation system as claimed in claim 1, wherein the indicating module comprises a plurality of direction indicator lights mounted on a main body of the mobile apparatus, for providing a direction instruction by flashing according to the instruction data.

4. The identification tag navigation system as claimed in claim 1, wherein the indicating module comprises a sound module mounted in the mobile apparatus for providing a direction instruction by a sound effect or a voice according to the instruction data.

5. The identification tag navigation system as claimed in claim 1, wherein the plurality of reference signals comprises a plurality of satellite signals.

6. The identification tag navigation system as claimed in claim 1, wherein the instruction data is a motion route from a current position to a destination position.

7. An identification tag navigation method, for receiving a destination information from a radio frequency identification tag to generate an direction instruction data, the method comprising steps of:
   accessing a tag carrier embedded with the radio frequency identification tag designating the radio frequency identification tag as an admission ticket to a region defined by a set of GPS coordinates;
   accessing a unique identification code used to distinguish the radio frequency identification tag from all other tags;
   accessing a GPS identification code from the radio frequency identification tag;
   checking whether the GPS identification code is recognized and determining whether the presence of the destination information is present and retrievable from said radio frequency identification tag based on the GPS identification code;
   accessing the destination information from the radio frequency identification tag if the GPS identification code determines whether access to the destination information should occur, wherein the destination information comprises a destination position data;
   receiving a plurality of reference signals to generate a current position data;
   computing a navigation route data according to the destination position data, the current position data, and a geographical data; and
   providing a direction instruction according to the navigation route data and the current position data.

8. The identification tag navigation method as claimed in claim 7, wherein the plurality of reference signals comprises a plurality of satellite signals.

9. The identification tag navigation method as claimed in claim 7, wherein the direction instruction is generated by a plurality of direction indicator lights.

10. The identification tag navigation method as claimed in claim 7, wherein the direction instruction is generated by a sound module.

11. A radio frequency identification tag navigation apparatus, for receiving a destination information from a radio frequency identification tag having an embedded tag carrier designating the radio frequency identification tag as an admission ticket to a region defined by a set of GPS coordinates to generate direction instruction data, the apparatus comprising:

- a radio frequency identification tag reading module, for accessing a unique identification code used to distinguish the radio frequency identification tag from all other tags, and a GPS identification code, and accessing the destination information from the radio frequency identification tag if the GPS identification code is recognized and determining whether the presence of the destination information is present and retrievable from said radio frequency identification tag based on the GPS identification code, wherein the destination information comprises a destination position data;
- a position module, for receiving a plurality of reference signals to generate a current position data;
- a memory, for storing a geographical data;
- a navigation module, for generating a navigation route data according to the destination position data, the current position data, and the geographical data, and further generating an instruction data according to the current position data and the navigation route data; and
- an indicating module, for showing a direction instruction according to the instruction data.

12. The identification tag navigation apparatus as claimed in claim 11, wherein the apparatus further comprises:

- a destination setting button, for triggering the identification tag reading module to access the identification tag.

13. The identification tag navigation apparatus as claimed in claim 11, wherein the indicating module comprises a plurality of direction indicator lights mounted on a main body of the mobile apparatus, for providing a direction instruction by flashing according to the instruction data.

14. The identification tag navigation apparatus as claimed in claim 11, wherein the indicating module comprises a sound module mounted in the mobile apparatus for providing a direction instruction by a sound effect or a voice according to the instruction data.

* * * * *